United States Patent
Son et al.

(10) Patent No.: US 9,028,724 B2
(45) Date of Patent: May 12, 2015

(54) METHOD FOR PREPARING WATER-SOLUBLE NANOPARTICLES AND THEIR DISPERSIONS

(75) Inventors: Won Il Son, Daejeon (KR); Eui Duk Kim, Daejeon (KR); Seok Heon Oh, Daejeon (KR)

(73) Assignee: Hanwha Chemical Corporation, Seoul (KR)

( * ) Notice: Subject to any disclaimer, the term of this patent is extended or adjusted under 35 U.S.C. 154(b) by 397 days.

(21) Appl. No.: 13/395,827

(22) PCT Filed: Sep. 14, 2010

(86) PCT No.: PCT/KR2010/006261
§ 371 (c)(1),
(2), (4) Date: Mar. 13, 2012

(87) PCT Pub. No.: WO2011/031118
PCT Pub. Date: Mar. 17, 2011

(65) Prior Publication Data
US 2012/0168692 A1 Jul. 5, 2012

(30) Foreign Application Priority Data
Sep. 14, 2009 (KR) ........................ 10-2009-0086334

(51) Int. Cl.
*H01B 1/12* (2006.01)
*C09C 3/10* (2006.01)
(Continued)

(52) U.S. Cl.
CPC ... *C09C 3/10* (2013.01); *C09C 1/62* (2013.01); *C09C 1/627* (2013.01); *C09C 1/644* (2013.01);
(Continued)

(58) Field of Classification Search
CPC ........ C23C 18/06; C23C 18/08; H05K 3/105; H01B 1/026; B82Y 30/00
USPC ............................................ 252/519.3, 518.1
See application file for complete search history.

(56) References Cited

U.S. PATENT DOCUMENTS 4,917,781 A 4/1990 Sharifian et al.
7,160,525 B1 * 1/2007 Peng et al. ........................ 423/1
(Continued)

FOREIGN PATENT DOCUMENTS

CN 1718275 A 1/2006
CN 1943925 A 4/2007
(Continued)

OTHER PUBLICATIONS
Lee et al., J. Colloid and Interface Science, 304 (2006) 92-97.*

*Primary Examiner* — Mark Kopec
*Assistant Examiner* — William Young
(74) *Attorney, Agent, or Firm* — The Webb Law Firm

(57) ABSTRACT

Provided is a method for preparing an aqueous dispersion of metal nanoparticles having superior dispersibility and being sinterable at low temperature by modifying the surface of metal nanoparticles having hydrophobic groups with hydrophilic groups. Specifically, by treating the surface hydrophobic groups of the metal nanoparticles with a surface modification solution containing a surfactant and a wetting-dispersing agent, the treatment throughput can be improved about 10-fold and the particles can be monodispersed without agglomeration. Further, by using an antioxidant and a ligand removal agent in the solution, denaturation and oxidation of the particles can be prevented and the high-boiling-point hydrophobic ligands can be eliminated effectively. The hydrophilically treated metal nanoparticles may be dispersed in an aqueous-based solvent to prepare a metal ink sinterable at low temperature.

18 Claims, 7 Drawing Sheets

(51) Int. Cl.
*C09C 1/62* (2006.01)
*C09C 1/64* (2006.01)
*C09D 11/322* (2014.01)
*C09D 11/52* (2014.01)

(52) U.S. Cl.
CPC .............. *C09D 11/322* (2013.01); *C09D 11/52* (2013.01); *C01P 2002/84* (2013.01); *C01P 2004/04* (2013.01)

(56) References Cited

U.S. PATENT DOCUMENTS

| | | |
|---|---|---|
| 2001/0018526 A1 | 8/2001 | Sano et al. |
| 2004/0242729 A1 | 12/2004 | Baran, Jr. et al. |
| 2005/0165120 A1 | 7/2005 | Kumar et al. |
| 2006/0084705 A1 | 4/2006 | Caruso et al. |
| 2006/0254387 A1 | 11/2006 | Lee et al. |
| 2007/0144305 A1 | 6/2007 | Jablonski et al. |
| 2007/0248678 A1 | 10/2007 | Woo et al. |
| 2007/0254822 A1 | 11/2007 | Szarvas et al. |
| 2008/0033209 A1 | 2/2008 | Szarvas |
| 2008/0090082 A1 | 4/2008 | Shim et al. |
| 2008/0264205 A1* | 10/2008 | Zeng et al. ............ 75/352 |
| 2009/0258076 A1* | 10/2009 | Cheon et al. ............ 424/491 |
| 2010/0233575 A1 | 9/2010 | Brotherston et al. |

FOREIGN PATENT DOCUMENTS

| | | |
|---|---|---|
| JP | 2007500209 A | 1/2007 |
| JP | 2009521598 A | 6/2009 |
| KR | 19907002082 A1 | 12/1990 |
| KR | 20010082102 A | 8/2001 |
| KR | 1020060021535 A | 3/2006 |
| KR | 1020060051411 A | 5/2006 |
| KR | 1020070015441 A | 2/2007 |
| KR | 1020070053783 A | 5/2007 |
| KR | 1020080029600 A | 4/2008 |
| KR | 1020080032814 A | 4/2008 |
| KR | 1020080109885 A | 12/2008 |
| TW | 200815540 A | 4/2008 |
| WO | 2009097319 A2 | 8/2009 |

* cited by examiner

METHOD FOR PREPARING WATER-SOLUBLE NANOPARTICLES AND THEIR DISPERSIONS

TECHNICAL FIELD

The present disclosure relates to a method for preparing an aqueous dispersion of metal nanoparticles having superior dispersibility and being sinterable at low temperature by modifying the surface of metal nanoparticles having hydrophobic groups with hydrophilic groups.

BACKGROUND ART

A dispersion of metal nanoparticles refers to a solution wherein highly conductive metal nanoparticles such as copper, nickel, cobalt, silver, etc. are dispersed. Metal nanoparticles with a diameter 100 nm or smaller exhibit unique properties including decreased melting point and sinterability at low temperature because of increased surface energy. Especially, since silver nanoparticles with a size of 30 nm or smaller can be sintered at low temperature of 150° C. or below, they may be used to print circuits on polymer materials. It is reported that the dispersion of metal nanoparticles may be prepared into ink to form wirings by a direct-write noncontact technology such as inkjet printing in order to produce printed circuit boards (PCBs) and flexible printed circuit boards (FPCBs).

With regard to production of such ultrafine nanoparticles, a method of using $C_6$-$C_{20}$ fatty acids to control the particle size is well known. However, although the metal nanoparticles prepared by this method are dispersed well in hydrophobic solvents such as toluene, they are not dispersible in aqueous-based solvents. With a metal nanoink prepared from such hydrophobic solvent-dispersible metal nanoparticles, it is difficult to form fine wirings through inkjet printing because of small contact angle with the substrate as well as high spreadability. Further, because volatile organic solvents are generally used as a dispersion medium, the cost is high and there is a risk that the toxic organic solvent may be evaporated.

Meanwhile, when a reducing agent is used to prepare metal nanoparticles in aqueous-based solvents, particle recovery rate is low and it is difficult to form ultrafine nanoparticles with a particle size 30 nm or smaller of uniform particle size distribution.

To solve these problems, ultrafine metal nanoparticles with a particle size 30 nm or smaller may be prepared in a hydrophobic solvent and then their surface may be hydrophilically treated so that they may be dispersed in aqueous-based solvents. However, when the metal nanoparticles are directly added to an aqueous-based solvent for dispersion, the metal nanoparticles are not completely dispersed in the aqueous-based solvent but are precipitated because of their hydrophobicity. Thus, it is difficult to prepare a high-concentration dispersion of 40 wt % or more. Moreover, copper nanoparticles are extremely difficult to make hydrophilic because the surface is easily oxidized upon contact with an aqueous-based solvent.

Metal nanoparticles capped with fatty acid are associated with the problem that the capping material is not removed well even at high temperatures because of the strong binding between the nanoparticles and the capping material. Because the capping material has a high boiling point, it may remain even after sintering of the metal nanoparticles and thereby increase the resistance of the wiring. Recently, polymer films such as polyimide (PI) are frequently used in FPCBs. In this regard, a dispersion of metal nanoparticles that can be sintered at low temperature of 250° C. or below and thereby exhibits low specific resistance is required. For this, it may be necessary to use a capping material evaporable or removable at low temperature or to effectively remove the high-boiling-point capping material.

Korean Patent Publication No. 10-2008-0032814 describes a method of reacting metal nanoparticles with an alcohol- or thiol-based solvent and modifying the surface of the metal nanoparticles by adding a capping material having a hydrophilic group for application as a dispersion for inkjet printing. With this method, nanopowders produced in large scale through the existing plasma process may be dispersed in an aqueous-based solvent. However, it is restricted to metal nanoparticles bound to amorphous carbon layer. Further, when the particles are dispersed in alcohol, the hydrophilic groups may not be attached on the entire surface of the particles if they remain as agglomerates without being separated. Moreover, when the particles are heated in alcohols or acids, the surface of the particles may be oxidized.

Korean Patent Application No. 10-2004-0070303 discloses a method of synthesizing hydrophobic particles in an organic solvent through pyrolysis and then making them hydrophilic. The method involves mixing a solution of water-insoluble particles with a solution of water-soluble ligands such that the surface of the water-insoluble nanoparticles is substituted with the water-soluble ligands, and then forming a shell by crosslinking the ligands. This method avoids the use of a toxic organic solvent. Further, since the particles are not directly contacted with the aqueous-based solvent, oxidation of the particles may be prevented. And, the rigid shell surrounding the particles results in improved water dispersibility. However, according to the example presented therein, only about 3 g of particles are produced with 1 L of a reaction solvent. Thus, it is difficult to produce the water-soluble particles in large scale. In addition, the capping material, i.e. the water-soluble ligand including fatty acid, may not be eliminated during sintering because of large thickness.

Korean Patent Application No. 10-2005-0087083 describes a method of synthesizing hydrophobic particles with uniform particle size in an organic solution and making them hydrophilic through chemical surface modification. However, this method is not environment-friendly since a toxic solvent such as chloroform is used. Besides, a strong covalent bond between the hydrophilic ligand 3-mercaptopropionic acid and the metal nanoparticles make it difficult to remove the organic material through sintering.

DISCLOSURE OF INVENTION

Technical Problem

The present disclosure is directed to providing a method for preparing an aqueous dispersion of metal nanoparticles having superior dispersibility in an aqueous-based solvent, obtained by modifying the surface of metal nanoparticles having hydrophobic groups with hydrophilic groups. For this, it should be possible to treat a large amount of particles at once in short time and the surface should not be oxidized, denatured or degenerated during the hydrophilic treatment of the particles. Further, the particles should be dispersed independently in the solution without agglomerating or precipitating. In addition, the high-boiling-point material such as fatty acid should be completely removed during the hydrophilic treatment so that the particles can be sintered at low temperature and exhibit low specific resistance. The present disclosure is also directed to providing a surface modification solution containing additives to solve these problems.

The surface-modified particles should have physical properties similar to those before the modification and specific resistance should be similar before and after the modification. That is to say, it is required that the capping material layer formed on the surface of the metal nanoparticles to confer stability thereto should be sufficiently thin such that it can be easily removed through sintering and does not remain in the resulting wiring. The capping material layer should be able to effectively disperse the metal nanoparticles having relatively higher specific gravity in the aqueous-based solvent and have appropriate functional groups since it needs to remain coordinated around the particles for a long period of time. Thus, the present disclosure is further directed to providing a method for preparing an aqueous dispersion of metal nanoparticles capable of significantly improving electrical conductivity when used to form conductive wirings and metal films.

In the present disclosure, an aqueous-based solvent containing a surfactant capable of being attached to metal nanoparticles is used as a surface modification solution. Further, a wetting-dispersing agent compatible with both the aqueous-based solvent and the hydrophobic solvent is added to improve homogeneous mixing of the two solvents, thereby increasing effective area for surface modification reaction so that a large amount of particles can be treated in short time, making the particles be dispersed individually so as to prevent particle agglomeration and allow the surface modification by the surfactant. Further, an antioxidant and a ligand removal agent are added to the mixture solution so as to prevent denaturation or oxidation of the metal nanoparticles so that the metal nanoparticles may attain their inherent physical properties after hydrophilic treatment. Then, the high-boiling-point hydrophobic ligands are eliminated to prepare an aqueous dispersion of hydrophilic metal nanoparticles sinterable at low temperature.

Solution to Problem

The advantages, features and aspects of the present disclosure will become apparent from the following description of the embodiments with reference to the accompanying drawings, which is set forth hereinafter. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. The terminology used herein is for the purpose of describing particular embodiments only and is not intended to be limiting of the example embodiments. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

The present disclosure provides a method for preparing an aqueous dispersion of metal nanoparticles, comprising:

(a) dispersing metal nanoparticles having hydrophobic ligands on the surface in a hydrophobic solvent;

(b) mixing the resulting dispersion with a surface modification solution comprising a surfactant, a wetting-dispersing agent and an aqueous-based solvent;

(c) mixing the resulting mixture solution with a ligand removal agent to form hydrophilic metal nanoparticles and separating them; and (d) dispersing the hydrophilic metal nanoparticles in an aqueous-based solvent.

In the step (a), the metal nanoparticles having hydrophobic ligand may be prepared by a plasma process, an arc discharge process, a wet reduction process using a reducing agent, a pyrolysis process, or the like. The metal nanoparticles may be noble metal or transition metal nanoparticles having a size of 1 to 200 nm. Specifically, the metal nanoparticles may be metals of one or more selected from gold (Au), silver (Ag), cobalt (Co), copper (Cu), iron (Fe), chromium (Cr), nickel (Ni), palladium (Pd), platinum (Pt) and tin (Sn), alloys thereof or oxides thereof.

The hydrophobic ligands serve to prevent agglomeration and provide stability against oxidation and may be one or more selected from a $C_6$-$C_{20}$ fatty acid such as oleic acid, caproic acid, stearic acid, etc. or a $C_4$-$C_{18}$ fatty acid amine such as oleyl amine, butyl amine, octyl amine, etc. The surface of the metal nanoparticles may be protected by the hydrophobic ligands.

In the step (a), the hydrophobic solvent may be used in an amount of 200 to 1000 parts by weight based on 100 parts by weight of the metal nanoparticles. A variety of hydrophobic solvents may be used in the step (a) depending on the particular hydrophobic ligands. Specifically, toluene, hexane, heptane, tetradecane, chloroform, methyl chloride, butyl carbitol acetate, ethyl carbitol acetate, α-terpineol, ethanol, acetone, methanol, etc. may be used. More specifically, toluene may be used.

The hydrophobic solvent may further comprise a wetting-dispersing agent, a viscosity control agent, a fatty acid, or the like for homogeneous dispersion of the metal nanoparticles. Further, the surfactant used in the step (b) to prevent an impact caused by direct contact between the metal nanoparticles and the aqueous-based solvent of the step (b) when they are added to the aqueous-based solvent may be added to the mixture solution of the step (a). The additive selected from a wetting-dispersing agent, a viscosity control agent, a fatty acid and a surfactant may be added in an amount of 1 to 30 parts by weight based on 100 parts by weight of the hydrophobic solvent. A ultrasonic disperser, a homogenizing agitator, a homogenizer, a bead mill or other apparatuses suitable to improve particle dispersibility may be used to improve particle dispersibility of the mixture solution of the step (a).

In the step (b), the dispersion of metal nanoparticles of the step (a) is mixed with a surface modification solution comprising a surfactant, a wetting-dispersing agent and an aqueous-based solvent. In the step (b), the dispersion of metal nanoparticles of the step (a) is added dropwise at a rate of 0.1 to 20 parts by weight per minute based on 100 parts by weight of the surface modification solution. If the addition rate is lower than 0.1 parts by weight per minute, productivity will be low. And, if the addition rate exceeds 20 parts by weight per minute, the solution may not be uniformly dispersed because too much dispersion is added to the aqueous-based solvent at once. After mixing of the dispersion of metal nanoparticles with the surface modification solution, the resulting solution may be mixed by agitating for 10 to 120 minutes.

The aqueous-based solvent of the step (b) may be one capable of completely dissolving the additives, i.e. the surfactant, the wetting-dispersing agent, the antioxidant and the ligand removal agent. In addition, a solvent that is mixed well with the hydrophobic solvent of the step (a) may be preferred. The selection of the aqueous-based solvent included in the surface modification solution may be different depending on the solvent used in the step (a). As specific examples, one or more solvent(s) selected from alcohols such as methanol, ethanol, isopropanol, tert-butanol, tert-amylalcohol, methylglycol, butoxyethanol, methoxyisopropanol, methoxypropoxyisopropanol, ethyleneglycol, water-soluble oligomers of ethyleneglycol, propyleneglycol, water-soluble oligomers of propyleneglycol, glycerol, etc.; ethers such as ethyleneglycol monomethylether, ethyleneglycol dimethylether, propyleneglycol monomethylether, propyleneglycol dimethylether, glycerolether, etc.; and ketones such as acetone, methylethylketone; dioxane, etc. may be used.

The surfactant of the step (b) functions to confer water solubility to the metal nanoparticles by being adsorbed thereto. The surfactant is composed of a hydrophobic moiety that can be adsorbed to the metal nanoparticles and a hydrophilic moiety facing the opposite direction and conferring water solubility to the metal nanoparticles. The hydrophobic moiety of the surfactant may comprise a $C_6$-$C_{18}$ alkyl chain, and the hydrophilic moiety may comprise a polymer with a weight average molecular weight of 600 to 20000. If the weight average molecular weight is smaller than 600, it may be difficult to attain sufficient water dispersibility. And, if it exceeds 20000, there is a high chance that the surfactant may remain in the wiring as ash after sintering.

The surfactant may be any one having the hydrophobic moiety and the hydrophilic moiety. Specifically, a non-ionic surfactant or an anionic surfactant may be used to prepare the aqueous dispersion of metal nanoparticles of the present disclosure. More specifically, one or more selected from alkalisoluble resin, poly(acrylic acid), polyimine, sulfosuccinic acid, alkyl phosphate, polyoxyethylene aliphatic ether such as Brij 52, 56, 76, 93, 97, 98, 700, etc., polyoxyethylene phenyl ether such as Triton X-100 or IGEPAL (Dow Chemical), Pluronic polymer, polyvinylpyrrolidone, dodecylbenzene sulfate (DBS), fatty acid amine ether polyoxyethylene, sorbitan fatty acid ester, polyoxyethylene sorbitan fatty acid ester, aliphatic ether containing polyoxyethylene, aromatic ether containing polyoxyethylene, polyethylene glycol ester, or the like may be used.

The surfactant of the step (b) may be used in an amount of 1 to 30 parts by weight based on 100 parts by weight of the aqueous-based solvent.

The wetting-dispersing agent added in the step (b) improves compatibility of the solvent of the step (a) with the solvent of the step (b) and, by penetrating between the metal nanoparticles, separates the nanoparticles by electrostatic repulsion or by steric hindrance resulting from a bulky structure, so that the particles do not agglomerate in the mixture solution the step (b). The wetting-dispersing agent included in the surface modification solution of the step (b) may be used in an amount of 1 to 30 parts by weight based on 100 parts by weight of the aqueous-based solvent. The wetting-dispersing agent may be one or more selected from polydimethylsilane, alkylol ammonium salt of an acidic polyester and alkylol ammonium salt of a polyacrylic acid.

Specifically, one or more selected from: BYK 180, 184, 191, 194, 151, 154, 187, 2090, 2091, 2095, 190, 181, 2163, 192, etc. available from BYK-Chemie; Tego 710, 720W, 730W, etc. available from Evonik Tego Chemie GmbH); and Zonyl FSA, FSE, FSP, UR, etc. available from DuPont may be used.

If the metal nanoparticles are susceptible to oxidation upon contact with the aqueous-based solvent, an antioxidant may be added to the surface modification solution of the step (b). The antioxidant may be one or more selected from glutathione, α-tocopherol, lipoic acid, uric acid, carotene, ubiquinol, propyl gallate, tartaric acid, citric acid, butylated hydroxyanisole, butylated hydroxytoluene, malonic acid, dithiothreitol, diborane, L-selectride, mercaptoethanol, tert-butylhydroquinone, melatonin, diphenylamine, hydrazine, p-benzenesulfonylhydrazide, hydrazine sulfate, oxalic acid, ascorbic acid, formic acid and all-transretinoic acid (ATRA). Specifically, one or more diphenylamine compound(s) selected from Santoflex 44PD (N,N'-di-sec-butyl-p-phenylenediamine) and VANLUBE 9317, RD, NA, 887, 887E, 7723, BHC, etc. available from R.T. Vanderbilt Company may be used. The antioxidant may be added in an amount of 5 to 30 parts by weight based on 100 parts by weight of the aqueous-based solvent of the step (b).

In the present disclosure, a ligand removal agent having a stronger coordination ability with the metal nanoparticles than existing ligands in order to completely remove the hydrophobic ligands from the surface of the metal nanoparticles and thereby improve sinterability of the metal nanoparticles at low temperature. Especially, quaternary ammonium salts have strong coordination ability with the metal nanoparticles. The quaternary ammonium salt may be those disclosed in Korean Patent Publication No. 2008-0109885, Korean Patent Publication No. 2007-0015441, Korean Patent Publication No. 2007-0053783, Korean Patent Publication No. 1990-7002082, Korean Patent Publication No. 2001-0082102, or the like. Specifically, the quaternary ammonium salt may be one or more selected from a tetraalkylammonium hydroxide compound, a tetraalkylammonium halide compound, a tetraalkylammonium borohydride compound, a tetraalkylammonium nitrate compound, a tetraalkylammonium phosphate compound, a tetraalkylammonium sulfate compound and a tetraalkylammonium hydrogen sulfate compound.

In the present disclosure, the ligand removal agent of the step (c) may be used in an amount of 0.1 to 30 parts by weight based on 100 parts by weight of the aqueous-based solvent of the step (b). The ligand removal agent may be previously added to the surface modification solution before mixing the dispersion of the step (a) with the surface modification solution in the step (b), may be added while mixing the dispersion of the step (a) with the surface modification solution, or may be added after mixing the dispersion of the step (a) with the surface modification solution.

The hydrophilic metal nanoparticles produced in the step (c) may be separated by centrifugation or filtering. Ethanol, acetone, methanol, hexane, etc. may be used as a rinsing solvent. The rinsing solvent may be added in an amount of 10 to 2000 parts by weight based on 100 parts by weight of the surface modification solution. The washed particles may be subjected to centrifugation at 1000 to 10000 rpm for 1 to 10 minutes and then recovered.

The hydrophilic metal nanoparticles recovered in the step (c) may be dispersed again in an aqueous-based solvent to prepare an aqueous dispersion of metal nanoparticles. Thus prepared hydrophilic metal nanoparticles may contain ultrafine metal nanoparticles with an average particle diameter of 1 to 20 nm.

The aqueous-based solvent of the step (d) may be one or more selected from the aqueous-based solvents described with reference to the aqueous-based solvent of the step (b). The aqueous-based solvent used in the step (d) may be the same as or different from the aqueous-based solvent used in the step (b).

The aqueous dispersion of metal nanoparticles according to the present disclosure is a very important technique in that a large amount of metal nanoparticles can be treated in short time through a simple process. Since the aqueous dispersion of metal nanoparticles experiences no surface oxidation even in an aqueous-based solvent, has good monodispersity with no particle agglomeration and is sinterable at low temperature of 100 to 250 C., it may be used to form highly conductive metal wirings not only on semiconductor materials but also on polymer materials.

The aqueous dispersion of metal nanoparticles according to the present disclosure may be widely utilized in the fields of electronics, materials, communications, machinery, medicine, agriculture, energy, environment, and so forth. Especially, it may be widely applicable in the field of electronics as a metal nanoparticle ink composition.

Advantageous Effects of Invention

The aqueous dispersion of metal nanoparticles according to the present disclosure is a very important technique in that a large amount of metal nanoparticles can be treated in short time through a simple process. Since the aqueous dispersion of metal nanoparticles experiences no surface oxidation even in an aqueous-based solvent, has good monodispersity with no particle agglomeration and is sinterable at low temperature, it may be used to form highly conductive metal wirings not only on semi-conductor materials but also on polymer materials.

BRIEF DESCRIPTION OF DRAWINGS

The above and other objects, features and advantages of the present disclosure will become apparent from the following description of certain exemplary embodiments given in conjunction with the accompanying drawings, in which.

It should be understood that the appended drawings are not necessarily to scale, presenting a somewhat simplified representation of various preferred features illustrative of the basic principles of the disclosure. The specific design features of the disclosure as disclosed herein, including, for example, specific dimensions, orientations, locations and shapes, will be determined in part by the particular intended application and use environment.

MODE FOR THE INVENTION

The examples and experiments will now be described. The following examples and experiments are for illustrative purposes only and not intended to limit the scope of this disclosure.

Preparation Example 1

Preparation of 6 nm Hydrophobic Silver (Ag) Nanoparticles

Figure 1:
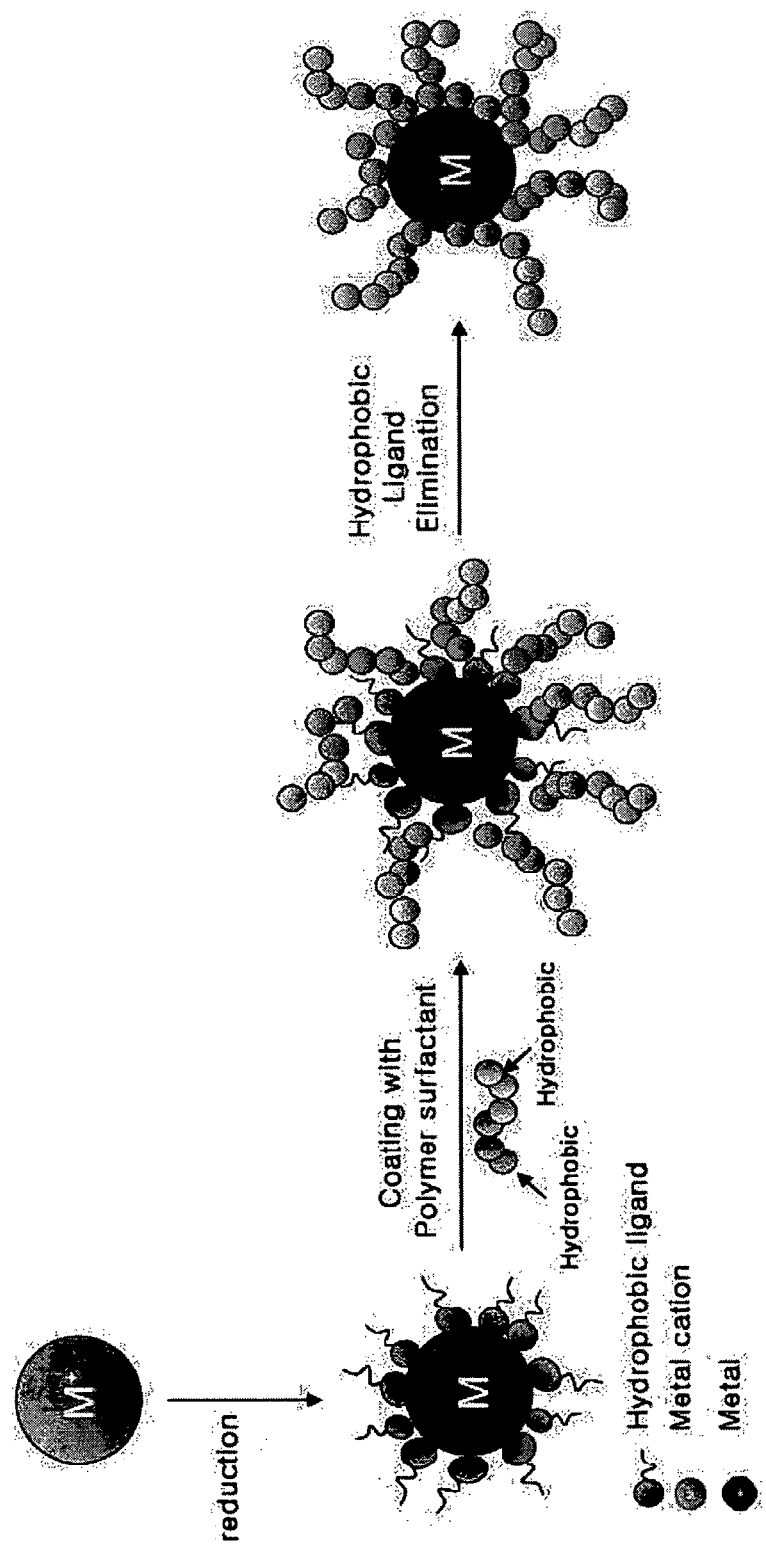
FIG. 1 illustrates a process of hydrophilically treating the surface of hydrophobic metal nanoparticles according to the present disclosure.
Figure 2:
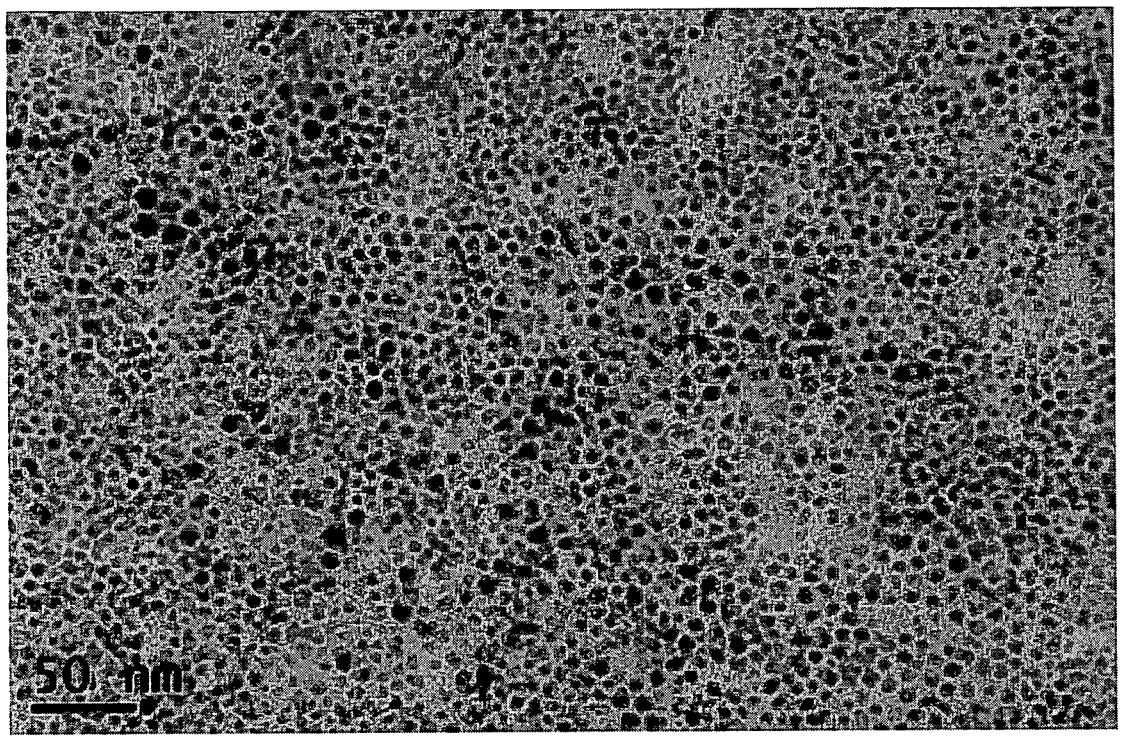
FIG. 2 shows a transmission electron microscopy (TEM) image of 6 nm hydrophobic silver (Ag) nanoparticles before hydrophilic treatment.

Silver acetate (50 g), as a metal precursor, and oleic acid (30 g) were dissolved in toluene (300 mL) at 70 C. Then, reaction was carried out by adding hydrazine (50 g) as a reducing agent. Reaction temperature was increased at a rate of 10 C./min. The reaction was performed at 100 C. for 2 hours. After the reaction was completed, the reaction mixture was cooled to room temperature, washed by adding ethanol, and then separated by centrifugation. FIG. 2 shows a transmission electron microscopy (TEM) image of thus prepared nanoparticles.

Comparative Example 1

Figure 3:
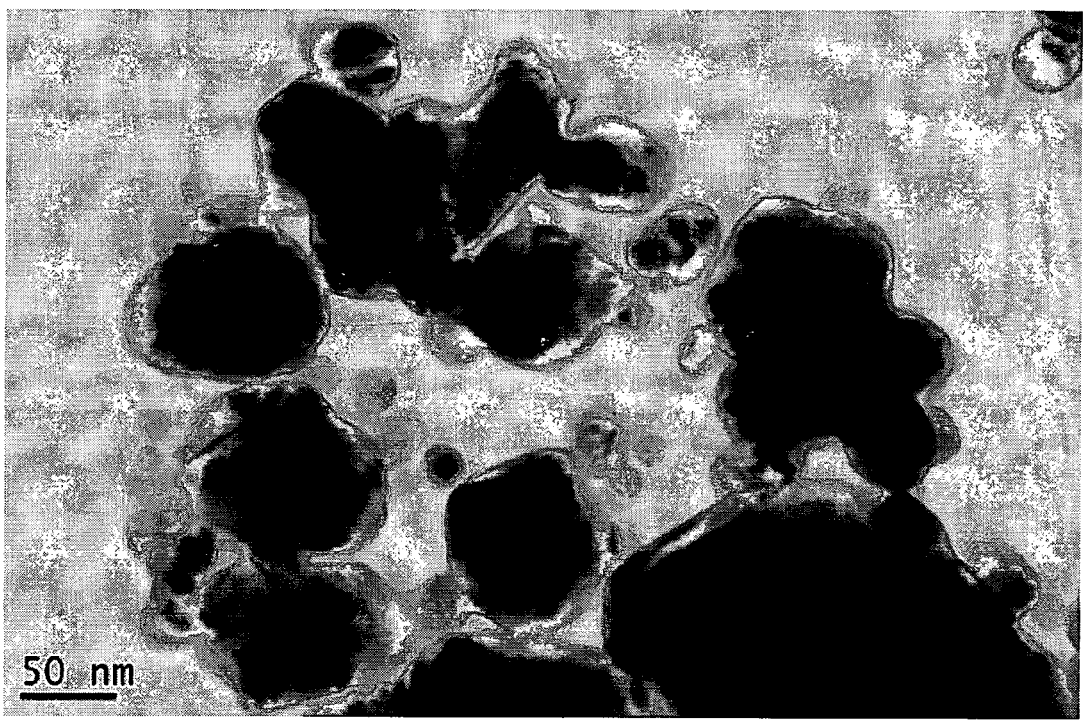
FIG. 3 shows a TEM image of Ag nanoparticles prepared in Comparative Example 1.

Hydrophilic Treatment of 6 Nm Ag Nanoparticles Using Alkali-Soluble Resin without Wetting-Dispersing Agent The hydrophobic Ag nanoparticles (2 g) prepared in Preparation Example 1 were dissolved in toluene (50 g) and uniformly dispersed for 30 minutes using a homogenizer. A surface modification solution was prepared by dissolving an alkali-soluble resin (Soluryl 70, weight average molecular weight=7000, Hanwha Chemical, 5 g) in methanol (100 g). The dispersion of nanoparticles was added thereto dropwise at a rate of 10 mL/min. After the addition was completed, the resulting mixture was allowed to react for 30 minutes. Then, the nanoparticles were recovered by centrifugation after rinsing twice with ethanol (100 g). FIG. 3 shows a TEM image of thus prepared particles. It was observed that the nanoparticles were agglomerated to form microparticles with a size 100 nm or larger. When the particles were dispersed in an aqueous medium, precipitation occurred within 1 hour.

Example 1

Hydrophilic Treatment of 6 nm Ag Nanoparticles Using Alkali-Soluble Resin

Figure 4:
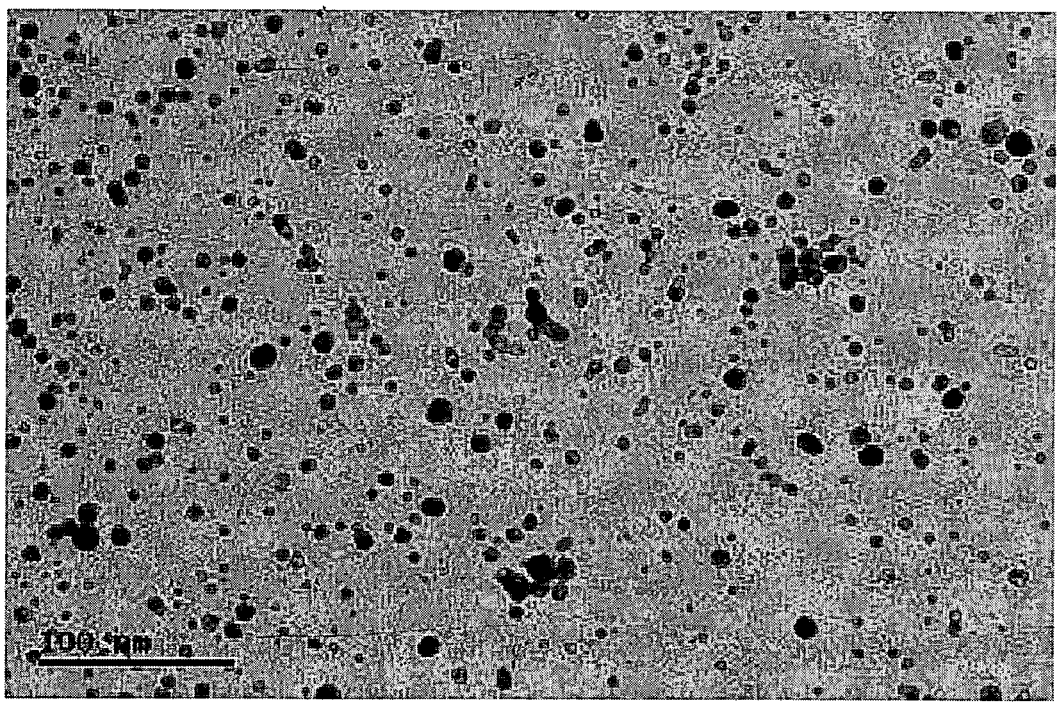
FIG. 4 shows a TEM image of Ag nanoparticles prepared in Example 1.
Figure 5:
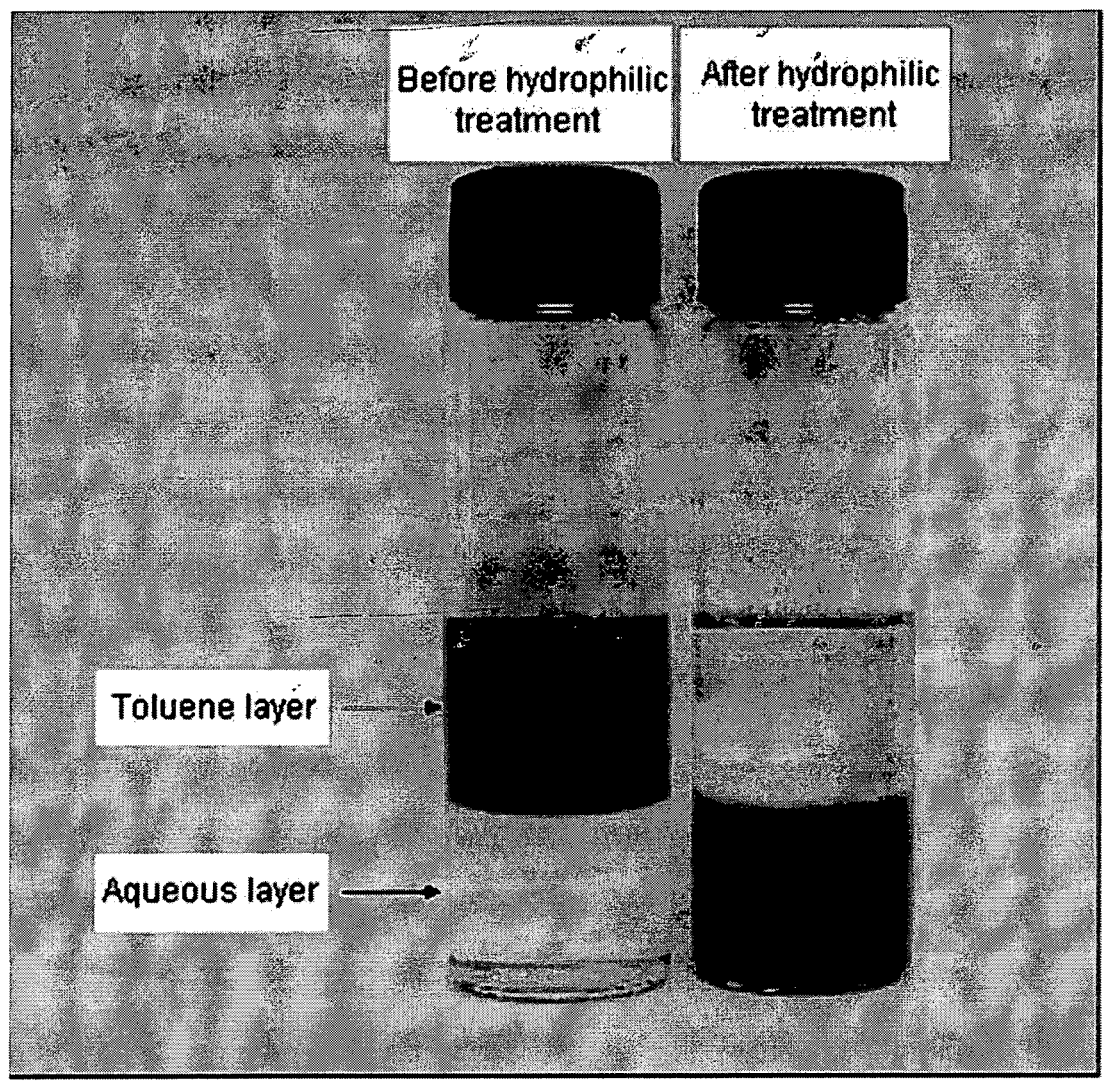
FIG. 5 compares Ag nanoparticles prepared in Example 1 before and after hydrophilic treatment.
Figure 6:
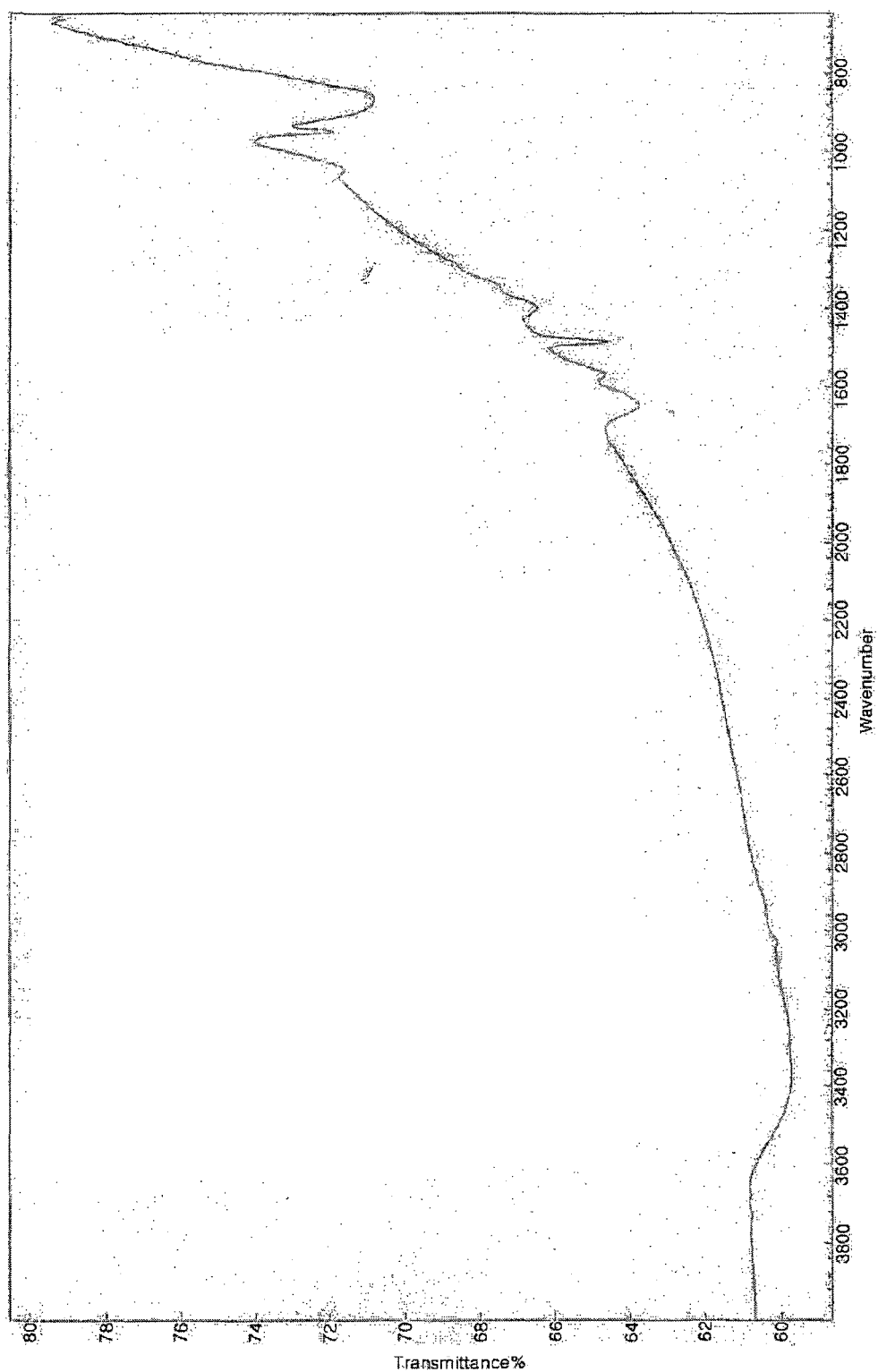
FIG. 6 shows an FT-IR analysis result of Ag nanoparticles prepared in Example 1.

The hydrophobic Ag nanoparticles (2 g) prepared in Preparation Example 1 were dissolved in toluene (50 g) and uniformly dispersed for 30 minutes using a homogenizer. A surface modification solution was prepared by dissolving an alkali-soluble resin (Soluryl 70, weight average molecular weight=7000, Hanwha Chemical, 5 g) and BYK192 (BYK Chemie, 3 g) in methanol (100 g). The dispersion of nanoparticles was added thereto dropwise at a rate of 10 mL/min. After allowing to react for 15 minutes and then adding tetramethylammonium hydroxide (TMAOH)/methanol 15 wt % solution (5 mL), the resulting mixture was allowed to react again for 15 minutes. Then, the nanoparticles were recovered by centrifugation after rinsing twice with ethanol (100 g). FIG. 4 shows a TEM image of thus prepared particles. It was observed that the hydrophilically treated nanoparticles retained their particle size of 6 nm or smaller. When the particles were dispersed in an aqueous medium, the dispersion remained stable for over 3 months. FIG. 5 compares images before and after the hydrophilic treatment. FT-IR analysis of the particles showed that oleic acid had been eliminated. The result is shown in FIG. 6.

Example 2

Hydrophilic Treatment of 6 nm Ag Nanoparticles Using Pluronic Polymer

Hydrophilic treatment was performed in the same manner as Example 1, except for using Pluronic F127 (weight average molecular weight=12,700, BASF, 3 g) instead of the alkali-soluble resin. TEM analysis revealed that the particle size was retained after the hydrophilic treatment. When the particles were dispersed in an aqueous medium, the dispersion remained stable for over 3 months.

Preparation Example 2

Preparation of 80 nm Hydrophobic Ag Nanoparticles

Ag nanoparticles (NanoDynamics, 2 g) having an average particle diameter of 80 nm were mixed in oleic acid (10 g) solvent for 30 minutes. After rinsing with ethanol, the nanoparticles were recovered by centrifugation and then dissolved in toluene (10 g).

Example 3

Hydrophilic Treatment of 80 nm Ag Nanoparticles Using Alkali-Soluble Resin

Figure 7:
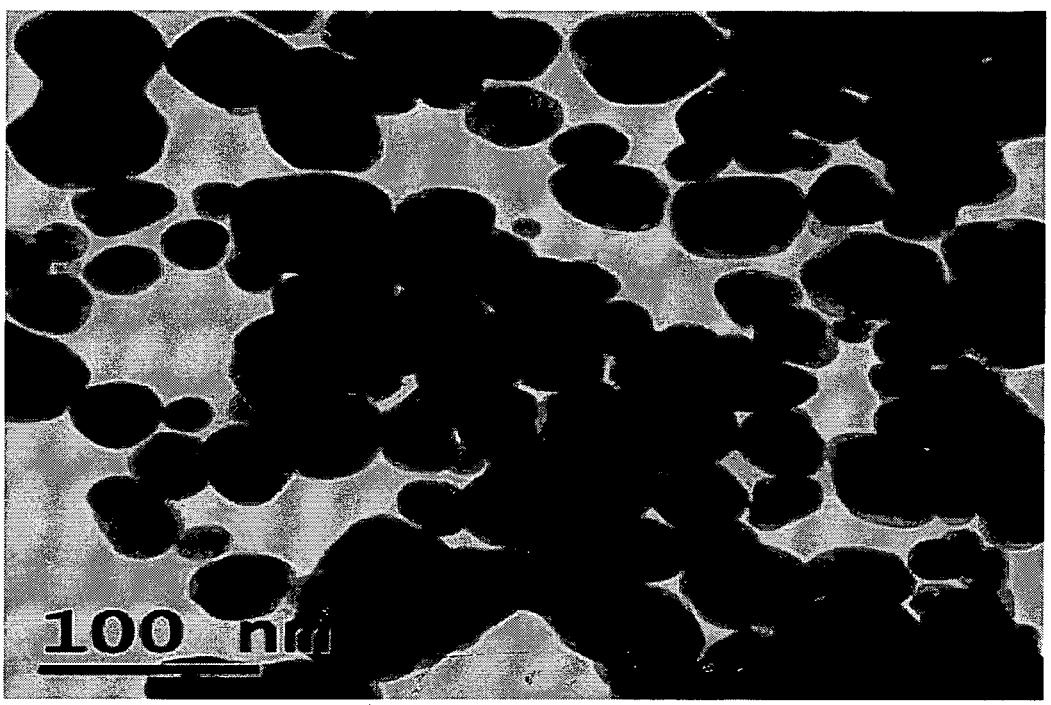
FIG. 7 shows a TEM image of Ag nanoparticles prepared in Example 3.

The hydrophobic Ag nanoparticles (2 g) prepared in Preparation Example 2 were treated as in Example 1. TEM analysis revealed that the particle size was retained after the hydrophilic treatment. The result is shown in FIG. 7. When the particles were dispersed in an aqueous medium, the dispersion remained stable for over 3 months.

Preparation Example 3

Preparation of 30 nm Hydrophobic Copper (Cu) Nanoparticles

Figure 8:
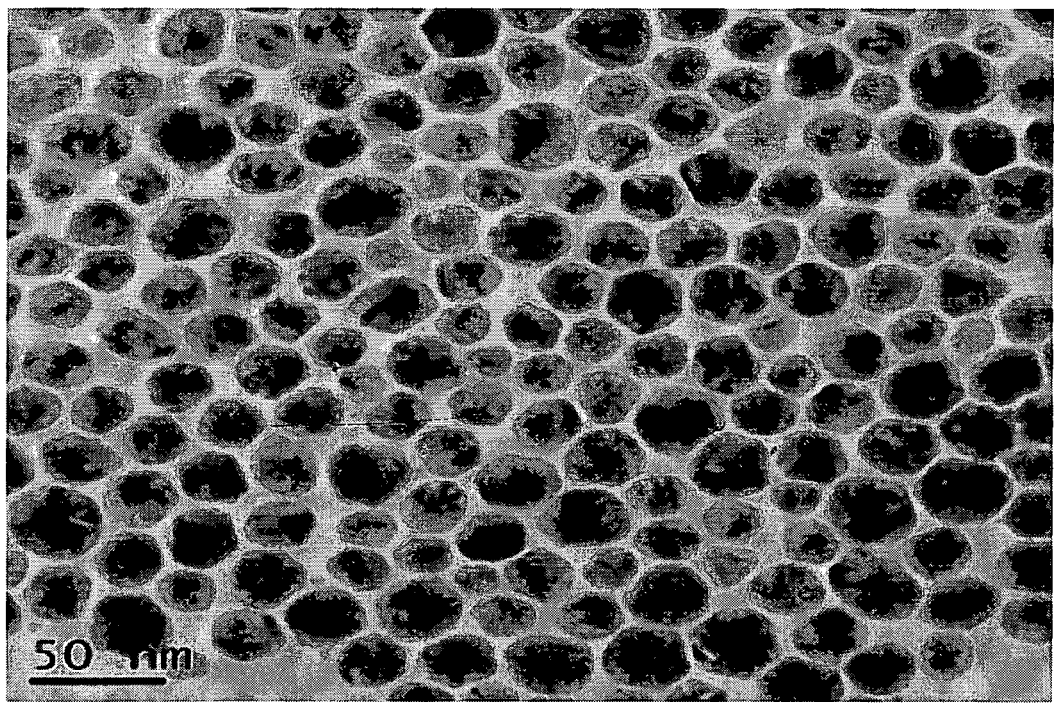
FIG. 8 shows a TEM image of 30 nm hydrophobic copper (Cu) nanoparticles before hydrophilic treatment.

Copper acetate (50 g), as a metal precursor, and oleic acid (30 g) were dissolved in toluene (300 mL) at 70° C. Then, reaction was carried out by adding hydrazine (50 g) as a reducing agent. Reaction temperature was increased at a rate of 10° C./min under nitrogen atmosphere. The reaction was performed at 100° C. for 2 hours. As the reaction proceeded, the initially blue color turned red gradually. After the reaction was completed, the reaction mixture was cooled to room temperature, washed by adding ethanol, and then separated by centrifugation. FIG. 8 shows a TEM image of thus prepared Cu nanoparticles.

Example 4

Hydrophilic Treatment of 30 nm Cu Nanoparticles Using Alkali-Soluble Resin

The hydrophobic Cu nanoparticles (2 g) prepared in Preparation Example 3 were dissolved in toluene (50 g) and uniformly dispersed for 30 minutes using a homogenizer. A surface modification solution was prepared by dissolving an alkali-soluble resin (Soluryl 70, weight average molecular weight=7000, Hanwha Chemical, 5 g), BYK180 (BYK Chemie, 3 g) and oxalic acid (3 g) in methanol (100 g). The dispersion of Cu nanoparticles was added thereto dropwise at a rate of 10 mL/min. After allowing to react for 30 minutes, the nanoparticles were recovered by centrifugation after rinsing with ethanol. When the particles were dispersed in an aqueous medium, the dispersion remained stable for over 1 month.

Example 5

Hydrophilic Treatment of 30 nm Cu Nanoparticles Using Polyoxyethylene

Figure 9:
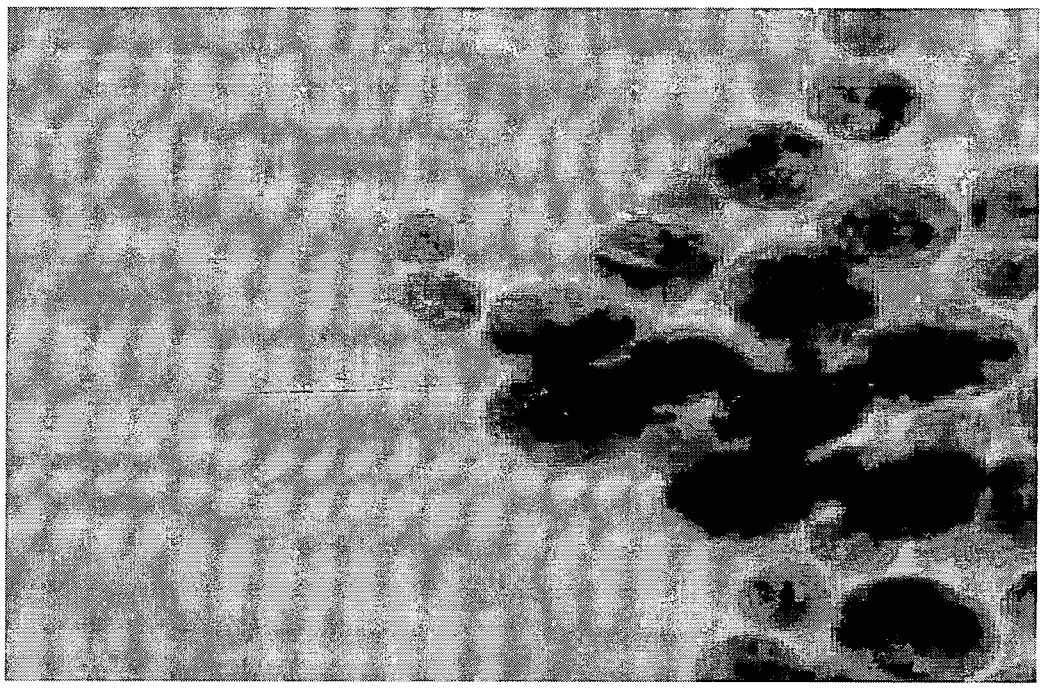
FIG. 9 shows a TEM image of Cu nanoparticles prepared in Example 5.

Hydrophilic treatment was performed in the same manner as Example 4, except for using polyoxyethylene oleylamine ether (weight average molecular weight=1000, Wako) as a surfactant instead of the alkali-soluble resin. FIG. 9 shows a TEM image of the resulting particles. TEM analysis revealed that the particle size of 30 nm or smaller was retained after the hydrophilic treatment. When the particles were dispersed in an aqueous medium, the dispersion remained stable for over 1 month.

Example 6

Hydrophilic Treatment of 30 nm Cu Nanoparticles Using Pluronic Polymer

Figure 10:
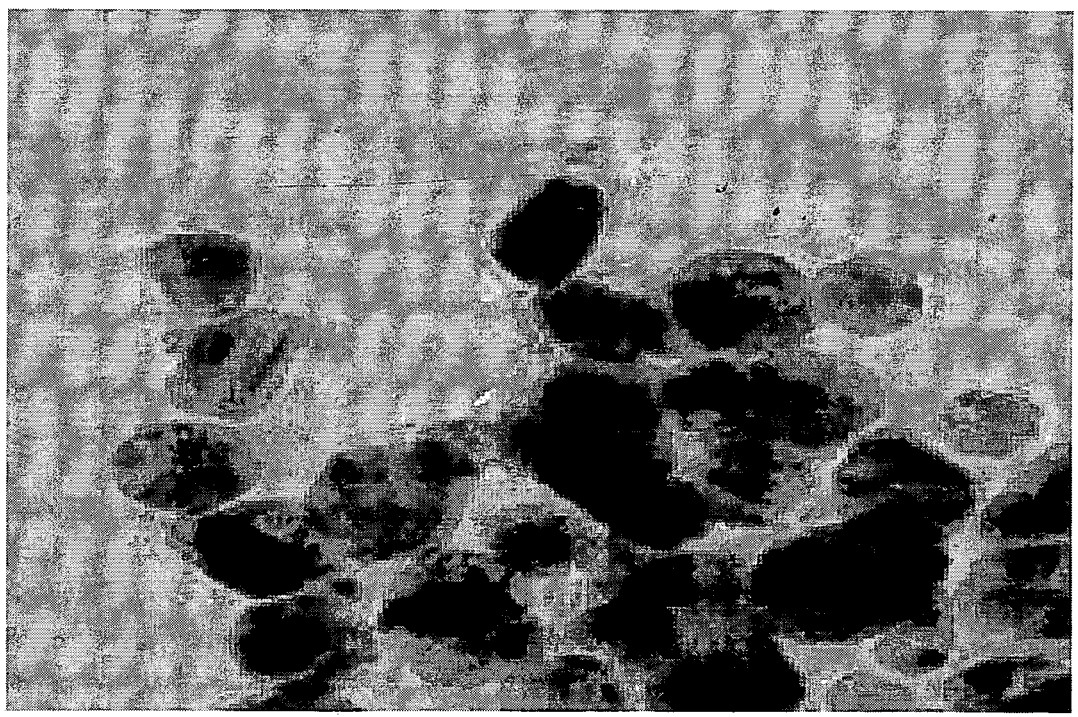
FIG. 10 shows a TEM image of Cu nanoparticles prepared in Example 6.

Hydrophilic treatment was performed in the same manner as Example 4, except for using Pluronic F127 (weight average molecular weight=12700, BASF) as a surfactant instead of the alkali-soluble resin. FIG. 10 shows a TEM image of the resulting particles. TEM analysis revealed that the particle size of 30 nm or smaller was retained after the hydrophilic treatment. When the particles were dispersed in an aqueous medium, the dispersion remained stable for over 1 month.

Preparation Example 4

Preparation of 80 nm Hydrophobic Cu Nanoparticles

Cu nanoparticles (Applied Nanotech, 2 g) having an average particle diameter of 80 nm were mixed in oleic acid (10 g) solvent for 30 minutes. After rinsing with ethanol, the nanoparticles were recovered by centrifugation and then dissolved in toluene (10 g).

Example 7

Hydrophilic Treatment of 80 nm Cu Nanoparticles Using Pluronic Polymer

Hydrophilic treatment was performed in the same manner as Example 6, except for using a dispersion of 80 nm Cu nanoparticles. The particle size was retained after the hydrophilic treatment.

Example 8

Ink Formulation and Conductivity of Ag Nanoparticles

A dispersion of particles for inkjet printing was prepared using the hydrophilic Ag nanoparticles prepared in Example 1. A solution was prepared by dissolving diethylene glycol (20 g), BYK190 (3 g) and monoethanolamine (3 g) in water (80 g). To the solution (5 g), the 6 nm Ag nanoparticles (5 g) prepared in Example 1 were added to prepare a 50 wt % Ag dispersion. The resulting solution was homogeneously dispersed for 30 minutes using a homogenizer. The solution was applied on a glass substrate to a thickness of 10 μm and then sintered in a 150° C. oven under air atmosphere for 30 minutes. Thus prepared conductive metal film was subjected to conductivity measurement. The conductivity was approximately 3 times that of bulk Ag metal, with a specific resistance of 5 μΩ·cm.

Example 9

Ink Formulation and Conductivity of Cu Nanoparticles

A dispersion of particles for inkjet printing was prepared using the hydrophilic Cu nanoparticles prepared in Example 5. A solution was prepared by dissolving diethylene glycol (20 g) and BYK190 (3 g) in water (80 g). To the solution (5 g), the 30 nm Cu nanoparticles (5 g) prepared in Example 5 were added to prepare a 50 wt % Cu dispersion. The resulting solution was homogeneously dispersed for 30 minutes using a homogenizer. The solution was applied on a glass substrate to a thickness of 10 μm and then sintered in a 250° C. oven under air atmosphere for 30 minutes. Thus prepared conductive metal film was subjected to conductivity measurement. The conductivity was approximately 6 times that of bulk Cu metal, with a specific resistance of 10 μΩ·cm.

As seen in FIGS. 2 to 10, the microparticles of Examples 1 to 9 according to the present disclosure retained their size after the surface treatment and could be dispersed stably in aqueous-based solvents, unlike Comparative Example 1. Also, as demonstrated in Examples 8 and 9, the dispersion of metal nanoparticles according to the present disclosure exhibited industrially applicable electrical conductivity after sintering.

While the present disclosure has been described with respect to the specific embodiments, it will be apparent to those skilled in the art that various changes and modifications may be made without departing from the spirit and scope of the disclosure as defined in the following claims.

The invention claimed is:

1. A method for preparing a dispersion of nanoparticles, comprising:
   dispersing nanoparticles having hydrophobic ligands on the surface in a hydrophobic solvent to form a first dispersion;
   mixing the first dispersion with a surface modification solution comprising (a) at least one wetting-dispersing agent selected from polydimethylsilane, alkylol ammonium salt of an acidic polyester and alkylol ammonium salt of a polyacrylic acid, (b) a surfactant, and (c) an aqueous-based solvent to form a first mixture solution;
   mixing the first mixture solution with a ligand removal agent to form a second mixture solution containing hydrophilic nanoparticles and separating the hydrophilic nanoparticles from the second mixture solution; and
   dispersing the hydrophilic nanoparticles in an aqueous-based solvent,
   wherein the nanoparticles comprise one of a metal and a metal oxide.

2. The method for preparing a dispersion of nanoparticles according to claim 1, wherein the nanoparticles have an average particle diameter of 1 to 200 nm.

3. The method for preparing a dispersion of nanoparticles according to claim 2, wherein the nanoparticles are metals of one or more selected from gold (Au), silver (Ag), cobalt (Co), copper (Cu), iron (Fe), chromium (Cr), nickel (Ni), palladium (Pd), platinum (Pt) and tin (Sn) or alloys thereof.

4. The method for preparing a dispersion of nanoparticles according to claim 2, wherein the nanoparticles are one or more metal oxides selected from gold (Au), silver (Ag), cobalt (Co), copper (Cu), iron (Fe), chromium (Cr), nickel (Ni), palladium (Pd), platinum (Pt) and tin (Sn).

5. The method for preparing a dispersion of nanoparticles according to claim 1, wherein the hydrophobic ligands are one or more selected from a $C_6$-$C_{20}$ fatty acid and a $C_4$-$C_{18}$ aliphatic amine.

6. The method for preparing a dispersion of nanoparticles according to claim 1, wherein the hydrophobic ligands are one or more selected from oleic acid, caproic acid, stearic acid, oleylamine, octylamine and butylamine.

7. The method for preparing a dispersion of nanoparticles according to claim 1, wherein the hydrophobic solvent is used in an amount of 200 to 1000 parts by weight based on 100 parts by weight of the nanoparticles.

8. The method for preparing a dispersion of nanoparticles according to claim 7, wherein the hydrophobic solvent is one or more selected from toluene, hexane, heptane, tetradecane, chloroform, methyl chloride, butyl carbitol acetate, ethyl carbitol acetate, a-terpineol, ethanol, acetone and methanol.

9. The method for preparing a dispersion of nanoparticles according to claim 7, wherein the hydrophobic solvent further comprises 1 to 30 parts by weight of an additive selected from a wetting-dispersing agent, a viscosity control agent, a fatty acid and a surfactant based on 100 parts by weight of the hydrophobic solvent.

10. The method for preparing a dispersion of nanoparticles according to claim 1, wherein the first dispersion is added to the surface modification solution dropwise at a rate of 0.1 to 20 parts by weight per minute based on 100 parts by weight of the surface modification solution.

11. The method for preparing a dispersion of nanoparticles according to claim 1, wherein the surface modification solution comprises 1 to 30 parts by weight of the surfactant and 1 to 30 parts by weight of the wetting-dispersing agent based on 100 parts by weight of the aqueous-based solvent.

12. The method for preparing a dispersion of nanoparticles according to claim 11, wherein the surfactant is a non-ionic surfactant, an anionic surfactant or a mixture thereof.

13. The method for preparing a dispersion of nanoparticles according to claim 11, wherein the surfactant is one or more selected from alkali-soluble resin, poly(acrylic acid), polyimine, sulfosuccinic acid, alkyl phosphate, polyvinylpyrrolidone, dodecylbenzene sulfate, fatty acid amine ether polyoxyethylene, sorbitan fatty acid ester, polyoxyethylene sorbitan fatty acid ester, aliphatic ether containing polyoxyethylene, aromatic ether containing polyoxyethylene and polyethylene glycol ester.

14. The method for preparing a dispersion of nanoparticles according to claim 11, wherein the surface modification solution further comprises 5 to 30 parts by weight of an antioxidant based on 100 parts by weight of the aqueous-based solvent.

15. The method for preparing a dispersion of nanoparticles according to claim 14, wherein the antioxidant is one or more selected from glutathione, α-tocopherol, lipoic acid, uric acid, carotene, ubiquinol, propyl gallate, tartaric acid, citric acid, butylated hydroxyanisole, butylated hydroxytoluene, malonic acid, dithiothreitol, diborane, L-selectride, mercaptoethanol, tert-butylhydroquinone, melatonin, diphenylamine, hydrazine, p-benzenesulfonylhydrazide, hydrazinesulfate, oxalic acid, ascorbic acid, formic acid and all-transretinoic acid (ATRA).

16. The method for preparing a dispersion of nanoparticles according to claim 1, wherein the ligand removal agent is used in an amount of 0.1 to 30 parts by weight based on 100 parts by weight of the aqueous-based solvent of the surface modification solution.

17. The method for preparing a dispersion of nanoparticles according to claim 16, wherein the ligand removal agent is one or more selected from a tetraalkylammonium hydroxide compound, a tetraalkylammonium halide compound, a tetraalkylammonium borohydride compound, a tetraalkylammonium nitrate compound, a tetraalkylammonium phosphate compound, a tetraalkylammonium sulfate compound and a tetraalkylammonium hydrogen sulfate compound.

18. The method for preparing a dispersion of nanoparticles according to claim 1, wherein the aqueous-based solvent is selected from water, methanol, ethanol, ethylene glycol, diethylene glycol, glycerol and a mixture thereof.

* * * * *